No. 852,798. PATENTED MAY 7, 1907.
R. E. NORTHWAY.
CLUTCH MECHANISM.
APPLICATION FILED DEC. 21, 1905.
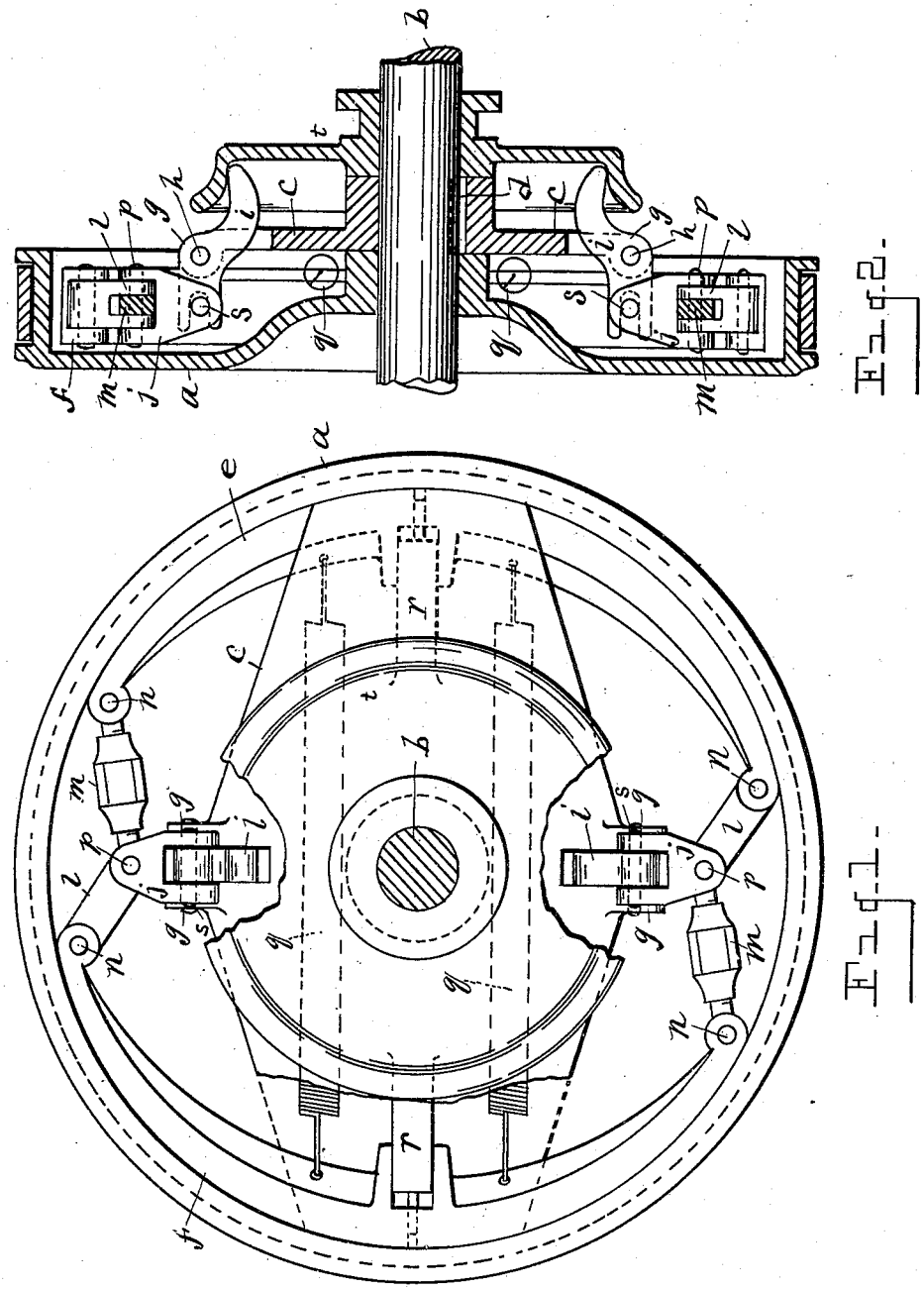
Witnesses.
O. B. Baenziger
A. M. Murphy
Inventor.
Ralph E. Northway
By Merrill S. Wright
his Attorney.

UNITED STATES PATENT OFFICE.

RALPH E. NORTHWAY, OF DETROIT, MICHIGAN, ASSIGNOR TO NORTHWAY MOTOR AND MANUFACTURING COMPANY, OF DETROIT, MICHIGAN, A CORPORATION OF MICHIGAN.

CLUTCH MECHANISM.

No. 852,798. Specification of Letters Patent. Patented May 7, 1907.

Application filed December 21, 1905. Serial No. 292,763.

*To all whom it may concern:*

Be it known that I, RALPH E. NORTHWAY, a citizen of the United States, residing at Detroit, county of Wayne, State of Michigan, have invented a certain new and useful Improvement in Clutch Mechanism, of which the following is a specification, reference being had to the accompanying drawings, which form a part of this specification.

My invention has for its object an improved clutch mechanism of superior construction and utility, the same forming, more particularly, an improved internal expanding, balanced, toggle clutch mechanism, adapted for a variety of uses.

My invention consists of the construction, combination and arrangement of devices and appliances hereinafter specified and claimed and illustrated in the accompanying drawings in which Figure 1 is a view in elevation showing a shaft in cross-section and parts broken away. Fig. 2 is a view in vertical section longitudinally of the shaft.

The aim of my invention is to provide a clutch mechanism of the nature described whereby great force can be applied, and in a simple and efficient manner.

I carry out my invention as follows:—

A drum is indicated at $a$ loosely mounted upon a shaft $b$. Rigidly mounted upon the shaft is a disk or carrier plate indicated at $c$. Said plate is shown keyed to the shaft as at $d$. Expansible friction clutch bands are indicated at $e$ and $f$ to engage the inner periphery of the drum. The disk or plate $c$ is shown provided with ears indicated at $g, g$ in which is fulcrumed, as indicated at $h$, a lever $i$ engaging an adjacent link $j$ with one end of which are jointedly connected lever arms $l$ and $m$, said arms being jointedly connected at their opposite extremities, as indicated at $n$, with the adjacent ends of the clutch bands $e, f$. The pivotal connection of the arms $l, m$ with the link $j$ is indicated at $p$. The arms $m$ are in the nature of turn-buckles and are constructed and arranged of greater length than the arms $l$.

The toggle levers $l, m$ are connected with each extremity of the friction clutch bands $e, f$, as shown, corresponding levers $i$ and related mechanisms, above described, being employed to actuate said toggle levers.

It will be observed that each of the clutch bands is provided with one of the turn buckle arms. Springs $q$ may be employed to retract the clutch bands. The plate $c$ is preferably provided with webs indicated at $r, r$ engaged by the clutch bands respectively to hold the bands from oscillating. A movable plate or body $t$ is sleeved upon the shaft constructed to be advanced toward the levers to expand the clutch bands. By making one of the toggle lever arms $l, m$ longer than its companion arm, I am enabled to secure a greater expansive force to apply the clutch bands than would be the case if both companion toggle arms were of equal length. The links $j$ are each preferably provided with a pin $s$, the adjacent end of the corresponding lever $i$ being forked, as shown, to engage the adjacent pin.

What I claim as my invention is

1. In combination a shaft, a drum loosely mounted thereupon, clutch bands to be outwardly expanded against the inner periphery of the drum, a carrier plate rigidly mounted upon the shaft, levers carried by said plate toward the periphery thereof, a link engaged by said lever, and toggle arms each jointedly connected at its outer end with the adjacent extremity of the adjacent clutch band and at its inner end with the corresponding link, one of said toggle arms provided with a turn buckle, and a movable flanged plate or body to actuate said lever substantially as described.

2. The combination of a shaft, a drum loosely mounted thereupon, a carrier plate rigidly mounted upon the shaft, clutch bands to be outwardly expanded against the inner periphery of the drum, levers fulcrumed to the carrier plate, toggle mechanism at opposite extremities of the clutch bands actuated by the corresponding levers to expand said clutch plates, and a movable flanged plate to actuate said levers, substantially as described.

3. The combination with a shaft of a drum loosely mounted upon the shaft, oppositely arranged friction clutch bands to be outwardly expanded against the inner periphery of the drum, a carrier plate rigidly mounted upon the shaft, levers fulcrumed upon the outer edge of said plate, and extending substantially at right angles to the plate, toggle arms jointedly connected at their outer ends with the adjacent extremities of the clutch bands, and a plate or body movable longitudinally upon the shaft to actuate the levers.

4. The combination with a shaft of a drum loosely mounted thereupon, oppositely arranged friction clutch bands to be outwardly expanded against the inner periphery of the drum, a carrier plate rigidly mounted upon the shaft, toggle arms jointedly connected at their outer end with the opposite extremities of the clutch bands, links jointedly connecting the extremities of the corresponding toggle arms, levers fulcrumed intermediate their ends upon the carrier plate engaged at one extremity with the corresponding link, a plate or body movable longitudinally upon the shaft to engage the outer ends of said levers to actuate said levers, said carrier plate provided with means to prevent the oscillation of the clutch bands, one of said toggle arms being longer than the companion arm.

5. The combination of a shaft, a drum loosely mounted thereupon, a carrier plate rigidly mounted upon the shaft, two clutch bands to be outwardly expanded against the inner periphery of the drum, two levers fulcrumed at opposite sides of the shaft upon the carrier plate, links engaged with one of the extremities of the levers respectively, toggle arms jointedly connected with each of said links, and with the outer extremity of the adjacent clutch bands, and a body movable longitudinally upon the shaft to actuate said levers, one of said toggle arms being longer than the companion arm.

In testimony whereof, I have signed this specification in the presence of two subscribing witnesses.

RALPH E. NORTHWAY.

Witnesses:
N. S. WRIGHT,
A. M. MURPHY.